US009503661B2

(12) United States Patent
Okazawa et al.

(10) Patent No.: US 9,503,661 B2
(45) Date of Patent: Nov. 22, 2016

(54) IMAGING APPARATUS AND IMAGE PROCESSING METHOD

(71) Applicant: Olympus Corporation, Hachioji-shi, Tokyo (JP)

(72) Inventors: Atsuro Okazawa, Hino (JP); Teruaki Yamasaki, Hino (JP); Takeshi Fukutomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/081,409

(22) Filed: Mar. 25, 2016

(65) Prior Publication Data

US 2016/0212364 A1 Jul. 21, 2016

Related U.S. Application Data

(63) Continuation of application No. PCT/JP2014/075089, filed on Sep. 22, 2014.

(30) Foreign Application Priority Data

Sep. 27, 2013 (JP) ................................. 2013-202540

(51) Int. Cl.
*G03B 13/00* (2006.01)
*H04N 5/232* (2006.01)
(Continued)

(52) U.S. Cl.
CPC ........ *H04N 5/3696* (2013.01); *H04N 5/23212* (2013.01); *H04N 5/23229* (2013.01)

(58) Field of Classification Search
CPC .. H04N 5/23212; H04N 5/3696; G02B 7/28; G02B 7/34; G02B 7/36; G02B 7/343
USPC ...................................... 348/345–369, 222.1
See application file for complete search history.

(56) References Cited

U.S. PATENT DOCUMENTS

| 7,880,805 B2* | 2/2011 | Chino | .................... H04N 5/332 348/342 |
| 2002/0135683 A1* | 9/2002 | Tamama | ................... G06T 1/60 348/222.1 |

(Continued)

FOREIGN PATENT DOCUMENTS

| JP | 2000-156823 | 6/2000 |
| JP | 3592147 | 11/2004 |

(Continued)

OTHER PUBLICATIONS

English language translation of an International Preliminary Report on Patentability and Written Opinion of the International Searching Authority ("IPRP/WO") to corresponding International Application No. PCT/JP2014/075089, mailed on Apr. 7, 2016 ( 6 pgs.).

(Continued)

*Primary Examiner* — Chia-Wei A Chen
(74) *Attorney, Agent, or Firm* — John C. Pokotylo; Straub & Pokotylo

(57) ABSTRACT

An imaging apparatus includes a high-frequency pattern detector calculating a difference or a ratio between a value obtained by integrating averages of pixel outputs of a first pixel group arranged in identical positions in a vertical direction with respect to a focus detection pixel or in identical positions in a vertical direction with respect to another focus detection pixel located around the focus detection pixel and a value obtained by integrating averages of pixel outputs of a second pixel group arranged in positions shifted from the first pixel group in the horizontal or vertical direction, and sets a high-frequency degree in accordance with a magnitude of the difference or the ratio. An application determination unit increases the mixing rate of the focus detection pixel when the high-frequency pattern degree is high.

6 Claims, 6 Drawing Sheets

(51) Int. Cl.
*H04N 5/228* (2006.01)
*H04N 5/369* (2011.01)

(56) References Cited

U.S. PATENT DOCUMENTS

| | | | | |
|---|---|---|---|---|
| 2008/0303919 | A1* | 12/2008 | Egawa | G06T 1/0007 348/223.1 |
| 2010/0201869 | A1* | 8/2010 | Shin | G06T 1/00 348/448 |
| 2011/0085785 | A1 | 4/2011 | Ishii | |
| 2011/0205423 | A1* | 8/2011 | Tsukada | G02B 7/38 348/345 |
| 2011/0265443 | A1* | 11/2011 | Ansari | F02C 7/057 60/39.23 |
| 2011/0273608 | A1* | 11/2011 | Tsukada | G02B 7/36 348/345 |
| 2012/0057057 | A1 | 3/2012 | Amano | |
| 2012/0236185 | A1 | 9/2012 | Ishii | |
| 2012/0262604 | A1* | 10/2012 | Ishii | H04N 5/23212 348/231.99 |
| 2012/0300104 | A1* | 11/2012 | Onuki | H04N 5/23212 348/302 |
| 2013/0155271 | A1* | 6/2013 | Ishii | H04N 5/23212 348/222.1 |
| 2014/0211075 | A1* | 7/2014 | Inoue | G02B 7/28 348/349 |
| 2014/0211076 | A1* | 7/2014 | Inoue | G02B 7/34 348/349 |
| 2014/0267839 | A1* | 9/2014 | Nishimaki | H04N 5/367 348/246 |
| 2015/0146052 | A1* | 5/2015 | Sawadaishi | G02B 7/34 348/266 |
| 2015/0215517 | A1* | 7/2015 | Kusaka | G02B 7/282 348/353 |
| 2015/0244926 | A1* | 8/2015 | Inoue | G02B 7/34 348/350 |

FOREIGN PATENT DOCUMENTS

| | | |
|---|---|---|
| JP | 2010-062640 | 3/2010 |
| JP | 2010-091848 | 4/2010 |
| JP | 2010-181485 | 8/2010 |
| JP | 2010-271670 | 12/2010 |
| JP | 2011-007882 | 1/2011 |
| JP | 2011-081271 | 4/2011 |
| JP | 2011-124704 | 6/2011 |
| JP | 2012-004729 | 1/2012 |
| JP | 2014-179939 | 9/2014 |
| WO | WO 2014/091854 | 6/2014 |

OTHER PUBLICATIONS

International Search Report to International Patent Application No. PCT/JP2014/075089, mailed on Nov. 25, 2014 (3 pgs.) with translation (2 pgs.).

Written Opinion of the International Searching Authority to International Patent Application No. PCT/JP2014/075089, mailed on Nov. 25, 2014 (3 pgs.).

Japanese First Office Action to Japanese Patent Application No. 2013-202540, mailed on Mar. 31, 2015 (3 pgs.) with translation (3 pgs.).

* cited by examiner

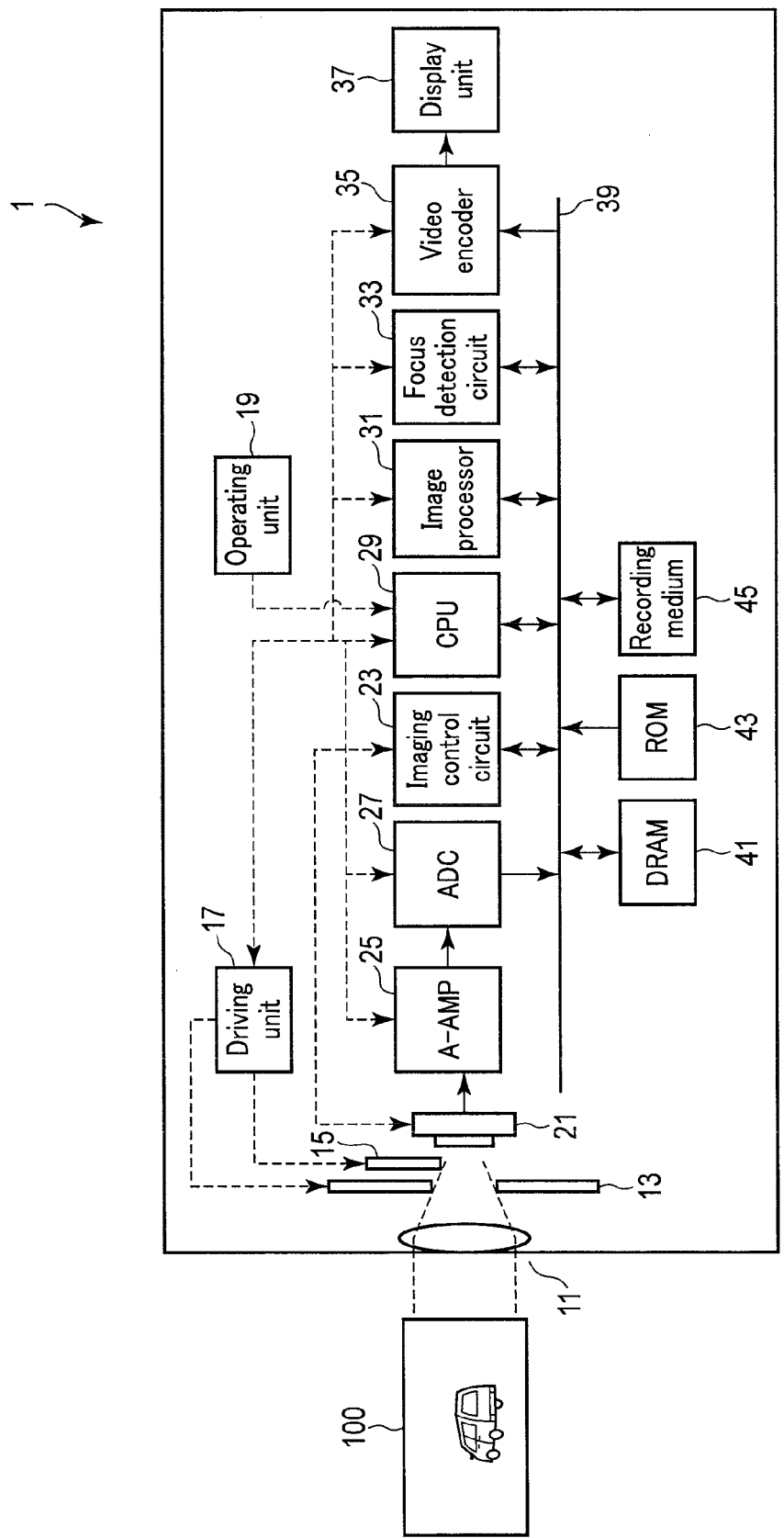
F I G. 1

FIG. 2

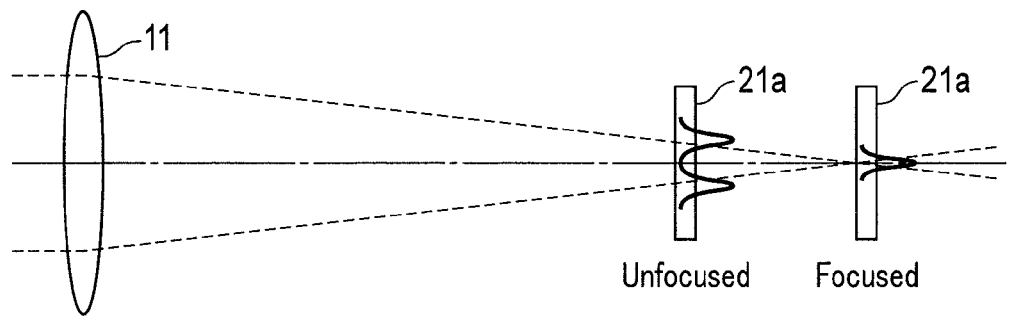
F I G. 5A
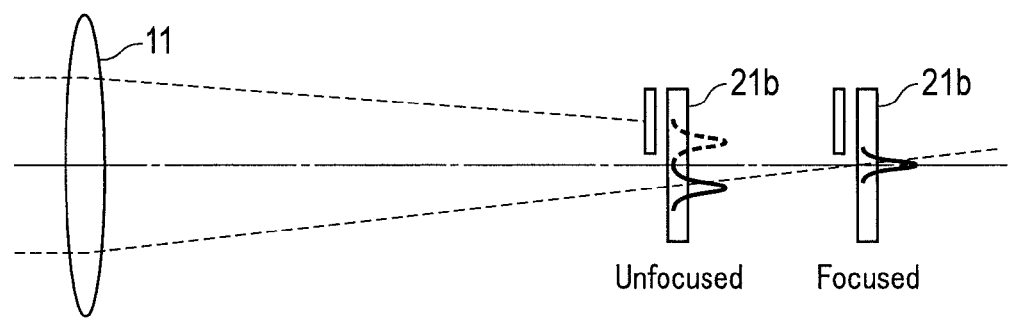
F I G. 5B

F I G. 7A

F I G. 7B

IMAGING APPARATUS AND IMAGE PROCESSING METHOD

CROSS-REFERENCE TO RELATED APPLICATIONS

This application is a Continuation application of PCT Application No. PCT/JP2014/075089, filed Sep. 22, 2014 and based upon and claiming the benefit of priority from the prior Japanese Patent Application No. 2013-202540, filed Sep. 27, 2013, the entire contents of both of which are incorporated herein by reference.

BACKGROUND OF THE INVENTION

1. Field of the Invention

The invention relates to an imaging apparatus and an image processing method that process a pixel output of an imaging element that detects a focusing state using part of pixels as focus detection elements of a phase difference method.

2. Description of the Related Art

For example, Japanese Patent No. 3592147 presents an imaging apparatus that detects a focusing state using part of pixels of an imaging element as focus detection elements. The imaging apparatus of Japanese Patent No. 3592147 sets part of pixels of an imaging element as focus detection pixels, images subject luminous fluxes that have passed through different pupil regions that are symmetrical with respect to the center of the optical axis of the imaging lens on a plurality of focus detection pixels, and detects a phase difference between the subject luminous fluxes, to detect the focus state of the imaging lens.

For example, part of the region of each focus detection pixel is shielded from light to receive one of the subject luminous fluxes that have passed through the different pupil regions of the imaging lens. For this reason, each focus detection pixel serves as a defective pixel that is not usable as a pixel as it is. For this reason, an imaging apparatus disclosed in Jpn. Pat. Appln. KOKAI Pub. No. 2010-062640 has a structure of performing gain control on the pixel output of each focus detection pixel or interpolating the pixel output using peripheral pixels to enable use of the focus detection pixel for recording and display.

BRIEF SUMMARY OF THE INVENTION

According to a first aspect of the invention, there is provided an imaging apparatus comprising: an imaging element including imaging pixels and a focus detection pixel; a high-frequency pattern detector detecting a high-frequency degree of a subject image pattern received by the imaging element, based on pixel outputs of a plurality of imaging pixels located around the focus detection pixel and a pixel output of the focus detection pixel; an interpolation processor performing an interpolation operation using the pixel outputs of the imaging pixels located around the focus detection pixel, determining an interpolation output corresponding to the pixel output of the focus detection pixel, and performing weighted mixing of the determined interpolation output with the pixel output of the focus detection pixel; and an application determination unit determining a mixing rate used in the weighted mixing in the interpolation processor based on an output of the high-frequency pattern detector, wherein the high-frequency pattern detector calculates a difference or a ratio between a value obtained by integrating averages of pixel outputs of a first pixel group arranged in identical positions in a vertical direction with respect to the focus detection pixel or in identical positions in a vertical direction with respect to another focus detection pixel located around the focus detection pixel and a value obtained by integrating averages of pixel outputs of a second pixel group arranged in positions shifted from the first pixel group in the horizontal or vertical direction, and sets the high-frequency degree in accordance with a magnitude of the difference or the ratio, and wherein the application determination unit increases the mixing rate of the focus detection pixel when the high-frequency pattern degree is high.

According to a second aspect of the invention, there is provided an imaging processing method of processing pixel outputs of an imaging element including imaging pixels and a focus detection pixel, comprising: detecting a high-frequency degree of a subject image pattern received by the imaging element, based on pixel outputs of a plurality of imaging pixels located around the focus detection pixel and a pixel output of the focus detection pixel; determining a mixing rate used in weighted mixing of an interpolation output with the pixel output of the focus detection pixel based on the high-frequency degree; and performing an interpolation operation using the pixel outputs of the imaging pixels located around the focus detection pixel, determining the interpolation output corresponding to the pixel output of the focus detection pixel, and performing weighted mixing of the determined interpolation output with the pixel output of the focus detection pixel, when the high-frequency degree is detected, a difference or a ratio is calculated, the difference or a ratio being a difference or a ratio between a value obtained by integrating averages of pixel outputs of a first pixel group arranged in identical positions in a vertical direction with respect to the focus detection pixel or in identical positions in a vertical direction with respect to another focus detection pixel located around the focus detection pixel and a value obtained by integrating averages of pixel outputs of a second pixel group arranged in positions shifted from the first pixel group in the horizontal or vertical direction, and sets the high-frequency degree in accordance with a magnitude of the difference or the ratio, and when the mixing rate is determined, the mixing rate of the focus detection pixel is increased when the high-frequency pattern degree is high.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating a configuration of a digital camera serving as an example of an imaging apparatus according to an embodiment of the present invention;

FIG. 2 is a diagram illustrating an example of a pixel array of an imaging element;

FIG. 5A is a first diagram for explaining phase shift;

FIG. 5B is a second diagram for explaining phase shift;

FIG. 7A is a first diagram for explaining high-frequency detection processing; and FIG. 7B is a second diagram for explaining high-frequency detection processing.

DETAILED DESCRIPTION OF THE INVENTION

Figure 3:
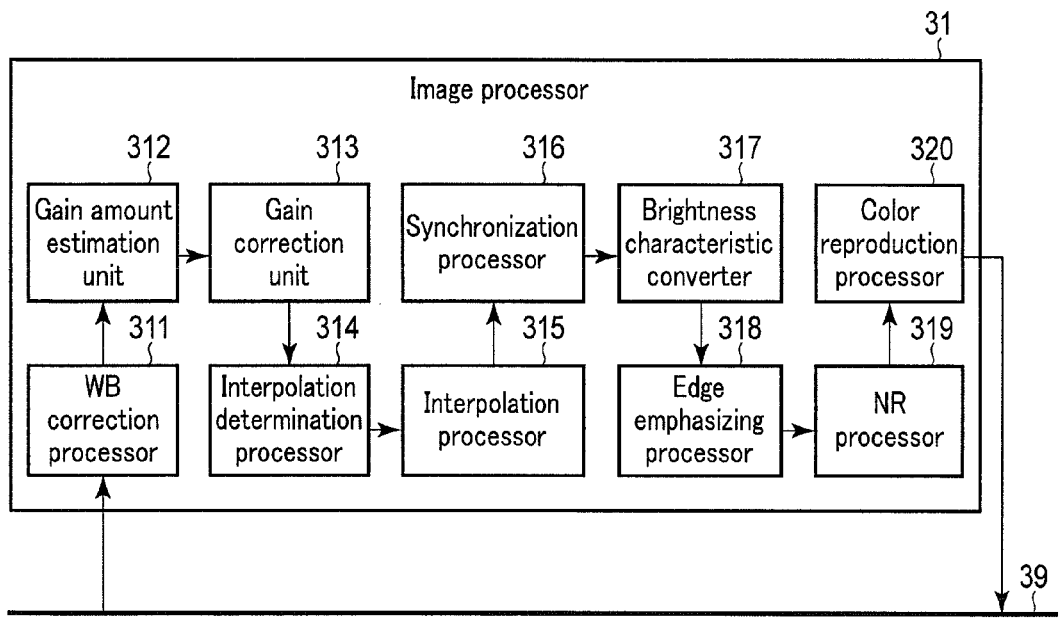
FIG. 3 is a diagram illustrating a detailed configuration of an image processor.

An embodiment of the present invention will be explained hereinafter with reference to the drawings.

FIG. 1 is a block diagram illustrating a configuration of a digital camera (hereinafter simply referred to as "camera") serving as an example of an imaging apparatus according to an embodiment of the present invention. In FIG. 1, a solid line with an arrow indicates a flow of data, and a broken line with an arrow illustrates a flow of a control signal.

The camera 1 illustrated in FIG. 1 includes an imaging lens 11, a diaphragm 13, a mechanical shutter 15, a driving unit 17, an operating unit 19, an imaging element 21, an imaging control circuit 23, an A-AMP 25, an analog/digital converter (ADC) 27, a CPU 29, an image processor 31, a focus detection circuit 33, a video encoder 35, a display unit 37, a bus 39, a DRAM (Dynamic Random Access Memory) 41, a ROM (Read Only Memory) 43, and a recording medium 45.

The imaging lens 11 is an imaging optical system to form an image from a subject 100 on the imaging element 21. The imaging lens 11 includes a focus lens to adjust a focusing position, or may be formed as a zoom lens. The diaphragm 13 is disposed on the optical axis of the imaging lens 11, and includes a variable aperture. The diaphragm 13 limits the amount of luminous flux that has transmitted from the subject 100 and passed through the imaging lens 11. The mechanical shutter 15 is formed to be openable and closable. The mechanical shutter 15 adjusts an incident time (exposure time of the imaging element 21) of subject luminous flux on the imaging element 21 from the subject 100. A publicly-known focal plane shutter or a lens shutter may be adopted as the mechanical shutter 15. The driving unit 17 controls driving of the imaging lens 11, the diaphragm 13, and the mechanical shutter 15 based on a control signal from the CPU 29.

The operating unit 19 includes various operating buttons such as a power button, a release button, a moving image button, a playback button, and a menu button, and various operating members such as a touch panel. The operating unit 19 senses operating states of the various operating members, and outputs a signal indicating a sensing result to the CPU 29. The shooting mode of the camera 1 can be selected with the operating unit 19 of the present embodiment. Specifically, the user can select the shooting mode of the camera 1 from a still image shooting mode and a moving image shooting mode, by operating the operating unit 19. The still image shooting mode is a shooting mode to shoot a still image, and the moving image shooting mode is a shooting mode to shoot a moving image.

The imaging element 21 is disposed on the optical axis of the imaging lens 11, behind the mechanical shutter 15, and in a position where the subject luminous flux is imaged by the imaging lens 11. The imaging element 21 is formed of photodiodes that form pixels and are arranged in a two-dimensional manner. The imaging element 21 in the present embodiment includes imaging pixels to acquire an image for recording and display and focus detection pixels to perform focus detection.

Each of the photodiodes forming the imaging element 21 generates an electrical charge corresponding to a light receiving amount. The electrical charges generated in the photodiodes are stored in capacitors connected to the respective photodiodes. The electrical charges stored in the capacitors are read as an image signal. The imaging element 21 in the present embodiment has a plurality of different methods for reading electrical charges. The electrical charges stored in the imaging element 21 are read out in accordance with a control signal from the imaging control circuit 23.

A color filter of a Bayer array, for example, is disposed in front of the photodiodes forming the pixels. The Bayer array includes lines, in each of which R pixels and G (Gr) pixels are arranged alternately in a horizontal direction, and lines, in each of which G (Gb) pixels and B pixels are arranged alternately.

The imaging control circuit 23 sets a driving mode of the imaging element 21 in accordance with a control signal from the CPU 29, and controls reading of an image signal from the imaging element 21 in accordance with the reading method corresponding to the set driving mode. For example, in the case of setting a driving mode that requires real-time reading of pixel data from the imaging element 21, such as in live-view display and moving image recording, pixel data from a plurality of pixels of the same color are mixed to be read out, or pixel data of specific pixels are thinned out, to achieve high-speed reading of pixel data. By contrast, in the case of setting a driving mode that requires image quality rather than real time processing, such as in recording a still image, pixel data of all the pixels are read out without mixed reading or thinning reading, to maintain the resolving power.

The A-AMP 25 amplifies an image signal read from the imaging element 21 in accordance with control of the imaging control circuit 23. The ADC 27 that functions as the imaging unit together with the imaging element 21, the imaging control circuit 23, and the A-AMP 25 converts the image signal that is output from the A-AMP 25 into a digital image signal (pixel data). In this specification, a group of a plurality of pieces of pixel data is referred to as imaging data hereinafter.

The CPU 29 controls the whole camera 1 in accordance with a program stored in the ROM 43. The image processor 31 performs various image processes on the imaging data to generate image data. For example, when a still image is recorded, the image processor 31 performs image processing for still image recording, to generate still image data. In the same manner, when a moving image is recorded, the image processor 31 performs image processing for moving recording, to generate moving image data. In addition, in live-view display, the image processor 31 performs image processing for display, to generate display image data. The structure of the image processor 31 will be explained in detail later.

The focus detection circuit 33 acquires pixel data from the focus detection pixels, and calculates a defocusing direction and a defocusing amount with respect to the focusing position of the imaging lens 11 using a publicly-known phase difference method, based on the acquired pixel data.

The video encoder 35 converts display image data generated in the image processor 31 into video data, and inputs the video data to the display unit 37 to display the image on the display unit 37.

The display unit 37 is a display unit such as a liquid crystal display and an organic EL display, and disposed on, for example, the rear surface of the camera 1. The display unit 37 displays an image in accordance with an operation of the video encoder 35. The display 37 is used for live-view display and display of recorded images.

The bus 39 is connected to the ADC 27, the CPU 29, the image processor 31, the focus detection circuit 33, the DRAM 41, the ROM 43, and the recording medium 45, and the like, and functions as a transmission path to transmit various data generated in these blocks.

The DRAM 41 is an electrically rewritable memory, and temporarily stores various data such as the imaging data (pixel data) described above, recording image data, display image data, and processing data in the CPU 29. An SDRAM (Synchronous Dynamic Random Access Memory) may be used for temporal storage. The ROM 43 is a nonvolatile memory such as a mask ROM and a flash memory. The ROM 43 stores a program used in the CPU 29, and various data such as adjustment values of the camera 1. The recording medium 45 is configured to be included in or attached to the camera 1, and records recording image data as an image file of a predetermined form.

Figure 2:
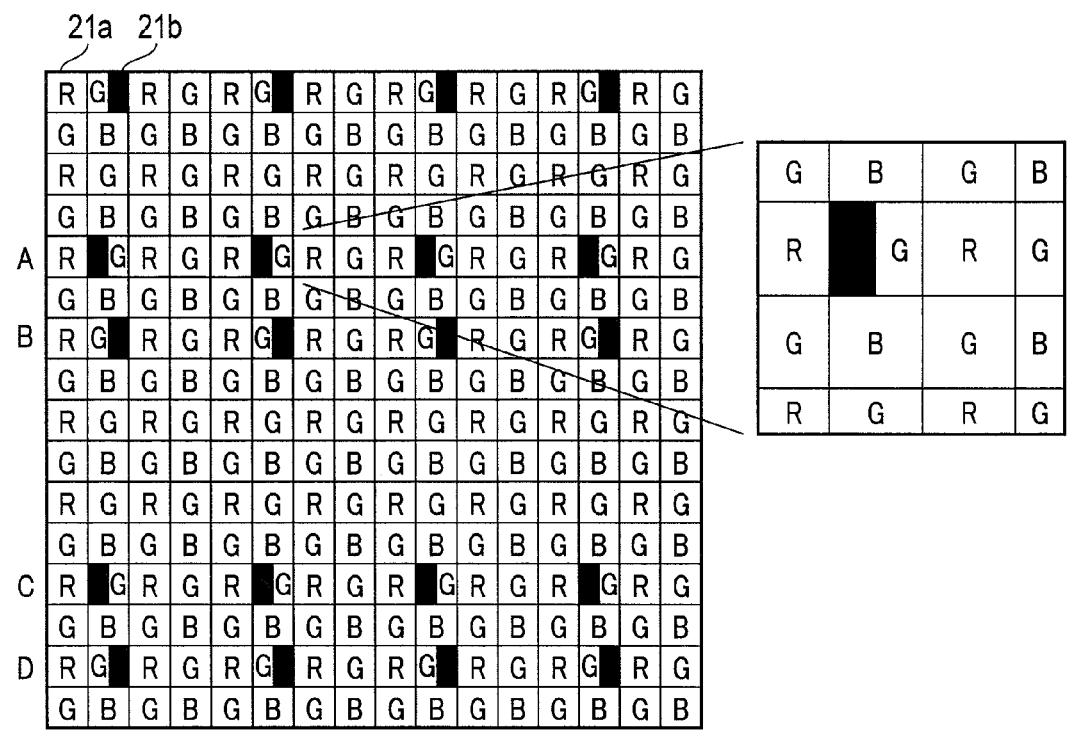

The configuration of the imaging element 21 will be explained with reference to FIG. 2. FIG. 2 is a diagram illustrating an example of a pixel array of the imaging element 21. The right side of FIG. 2 illustrates an enlarged view of part of the pixels. Although FIG. 2 illustrates an example of a Bayer array, the array of the color filter is not limited to a Bayer array, but various arrays may be applied.

As described above, the imaging element 21 with a Bayer array includes pixel lines, in each of which R pixels and G (Gr) pixels are arranged alternately in the horizontal direction, and pixel lines, in each of which G (Gb) pixels and B pixels are arranged alternately. In other words, sets of four pixels illustrated in the right enlarged view, that is, a Gr pixel, an R pixel, a Gb pixel, and a B pixel, are arranged repetitively in the horizontal and vertical directions.

In the present embodiment, focus detection pixels 21*b* are arranged in positions of part of imaging pixels 21*a*. Each of the focus detection pixels is a pixel in which one of right and left regions is shielded from light with a light-shielding film. In the example of FIG. 2, lines including focus detection pixels with a light-shielded left half surface (hereinafter referred to as "right-opening focus detection pixels") and lines including focus detection pixels with a light-shielded right half surface (hereinafter referred to as "left-opening focus detection pixels") are arranged such that they are close to each other in the vertical direction.

Because the area of each pixel is reduced in the case of using an imaging element with a large number of pixels, it can be considered that almost the same image is formed in pixels that are arranged close to each other. For this reason, arranging focus detection pixels as illustrated in FIG. 2 enables detection of a phase difference with a pair of a focus detection pixel in line A of FIG. 2 and a focus detection pixel of line B. A phase difference can also be detected with a pair of a focus detection pixel of line C and a focus detection pixel of line D.

In the example of FIG. 2, a light-shielded region in a focus detection pixel is one of left and right regions. In this case, a horizontal phase difference can be detected. By contrast, setting a light-shielded region to one of upper and lower regions or an oblique region enables detection of a vertical phase difference or a phase difference in an oblique direction. The light-shielded area may not be ½ the pixel region, as long as the area has an area of a certain degree. In addition, although focus detection pixels are arranged in G pixels in FIG. 2, focus detection pixels may be arranged in pixels other than G pixels, that is, any of R pixels or B pixels. Although the example of FIG. 2 illustrates the case of performing pupil division by a light-shielding part of the region of the focus detection pixel, it suffices that the focus detection pixel is capable of selectively receiving one of subject luminous fluxes serving as a pair and having passed through different pupil regions of the imaging lens 11. For this reason, the focus detection pixel may not have a structure in which part of the region is shielded from light, but pupil division may be performed with, for example, a micro lens for pupil division. FIG. 2 illustrates the case where a focus detection pixel is arranged in a four-pixel cycle in the horizontal direction. The cycle for arranging a focus detection pixel is not limited to a specific cycle.

Because part of the region of each focus detection pixel is shielded from light, a decrease in light amount occurs. The decrease in light amount also depends on the position of the light-shielding film, the angle of light made incident on the focus detection pixel, and the image height, as well as the area of the light-shielding film formed on the focus detection pixel. The image processor 31 corrects such decrease in light amount.

FIG. 3 is a diagram illustrating a detailed configuration of the image processor 31. In FIG. 3, illustration of blocks other than the image processor 31 is omitted. As illustrated in FIG. 3, the image processor 31 includes a white balance (WB) correction processor 311, a gain amount estimation unit 312, a gain correction unit 313, an interpolation determination processor 314, an interpolation processor 315, a synchronization processor 316, a brightness characteristic converter 317, an edge emphasizing processor 318, a noise reduction (NR) processor 319, and a color reproduction processor 320.

The WB correction processor 311 amplifies each color component of imaging data with a predetermined gain amount, to perform white balance correction processing to correct a color balance of the image.

The gain amount estimation unit 312 estimates a gain amount to correct a pixel output of the focus detection pixel in the gain correction unit 313. The gain amount is estimated in accordance with the light amount decrease amount of the focus detection pixel for the imaging pixel. The light amount decrease amount of the focus detection pixel is calculated based on a ratio of the pixel output of the focus detection pixel to the pixel output of the imaging pixel in the vicinity of the focus detection pixel. The gain correction unit 313 corrects the pixel output of the focus detection pixel in accordance with the gain amount estimated in the gain amount estimation unit 312.

The interpolation determination processor 314 determines the application rate of the pixel output of the focus detection pixel subjected to gain correction in the gain correction unit 313. The application rate is a weighting coefficient in weighted addition of the gain-corrected pixel output of the focus detection pixel to the pixel outputs of the peripheral imaging pixels around the focus detection pixel. The peripheral imaging pixels are, for example, four imaging pixels of the same color (same component in the case of using a Bayer array) around the focus detection pixel. The number of pixels of the peripheral imaging pixels is not limited to four, as a matter of course. The application rate is determined in accordance with, for example, variation (standard deviation) of pixel outputs of the peripheral imaging pixels around the phase difference detection pixel.

The interpolation processor 315 performs interpolation processing to perform weighted addition of the pixel output of the focus detection pixel that has been gain-corrected by the gain correction unit 313 to the pixel outputs of the peripheral imaging pixels.

The synchronization processor 316 converts imaging data in which a pixel corresponds to a color component, such as imaging data that is output through the imaging element 21 and corresponds to the Bayer array, into image data in which a pixel corresponds to a plurality of color components. The brightness characteristic converter 317 converts the brightness characteristic (gamma characteristic) of the image data into one suitable for display and recording. The edge emphasizing processor 318 multiplies an edge signal extracted from the image data using a band pass filter or the like by an edge emphasis coefficient, and adds the result to the original image data, to emphasize the edge (outline) component in the image data. The NR processor 319 removes a noise component in the image data using coring processing or the like. The color reproduction processor 320 performs various processes to perform proper color reproduction of the image data. An example of the processing is color matrix operation processing. Color matrix operation processing is processing of multiplying the image data by a color matrix coefficient corresponding to the white balance mode, for example. The color reproduction processor 320 also performs correction of saturation and hue.

Figure 4:
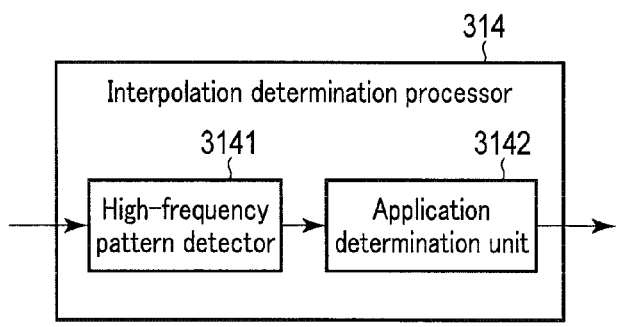
FIG. 4 is a diagram illustrating a configuration of an interpolation determination processor.

FIG. 4 is a diagram illustrating a configuration of the interpolation determination processor 314. The interpolation determination processor 314 includes a high-frequency pattern detector 3141 and an application determination unit 3142.

The high-frequency pattern detector 341 detects a high frequency degree of a subject image pattern in the imaging data. The gain application determination unit 3142 calculates an application rate of the pixel output of the focus detection pixel subjected to gain correction in the gain correction unit 313, based on the high frequency degree of the subject image pattern detected in the high-frequency pattern detector 3141. The details of the method for detecting the high frequency degree of the subject image pattern and the method for calculating the application rate will be explained later.

Next, a phase difference shift occurring in the imaging element including focus detection pixels will be explained hereinafter with reference to FIG. 5A and FIG. 5B. FIG. 5A illustrates an image formation state of an image in the imaging pixel 21a. FIG. 5B illustrates an image formation state of an image in the focus detection pixel 21b.

To simplify the explanation, supposing that the subject is a point light source and the imaging lens 11 is in a focused state, and that subject luminous fluxes serving as a pair, outgoing from the subject, and having passed through different pupil regions that are symmetrical with respect to the center of the optical axis of the imaging lens 11 are imaged in the same position on the imaging element 21. This means that the peak position of the subject image formed in the imaging pixel 21a agrees with the peak position of the subject image formed in the focus detection pixel 21b. As illustrated in FIG. 5A, both the subject luminous fluxes serving as a pair and having passed through different pupil regions are made incident on the imaging pixel 21a. For this reason, no decrease in light amount occurs in the imaging pixel 21a. By contrast, as illustrated in FIG. 5B, only one of the subject luminous fluxes serving as a pair is made incident on the imaging element 21, with respect to the focus detection pixel 21b. For this reason, a decrease in light amount occurs in the focus detection pixel 21b.

By contrast, when the imaging lens 11 is in an unfocused state, the subject luminous fluxes serving as a pair, outgoing from the subject, and having passed through different pupil regions of the imaging lens 11 are imaged in different positions on the imaging element 21. Specifically, a phase difference occurs between subject images formed by the subject luminous fluxes serving as a pair. The defocusing amount and the defocusing direction of the imaging lens 11 are detected, by detecting the phase difference from a correlation between the subject images detected in the right-opening focus detection pixel and the left-opening focus detection pixel. As illustrated in FIG. 5B, both the subject luminous fluxes having passed through the different pupil regions are made incident on the imaging pixel 21. For this reason, blurring occurs in the imaging pixel 21a due to the subject luminous fluxes made incident on different positions, although no decrease in light amount occurs. By contrast, as illustrated in FIG. 5B, only one of the luminous fluxes serving as a pair is made incident on the imaging element 21, with respect to the focus detection pixel 21b. In this case, although no blurring occurs, unlike the imaging pixel 21a, the peak position is shifted from the peak position in the case where the imaging lens 11 is in the focused state. In the present embodiment, such a phenomenon in which the peak position is shifted is referred to as "phase shift". The influence of phase shift appears as a moire in an image when the phase shift is occurred at the time of moving image recording or live-view display. The image processor 31 corrects the influence of a moire like this.

Figure 6:
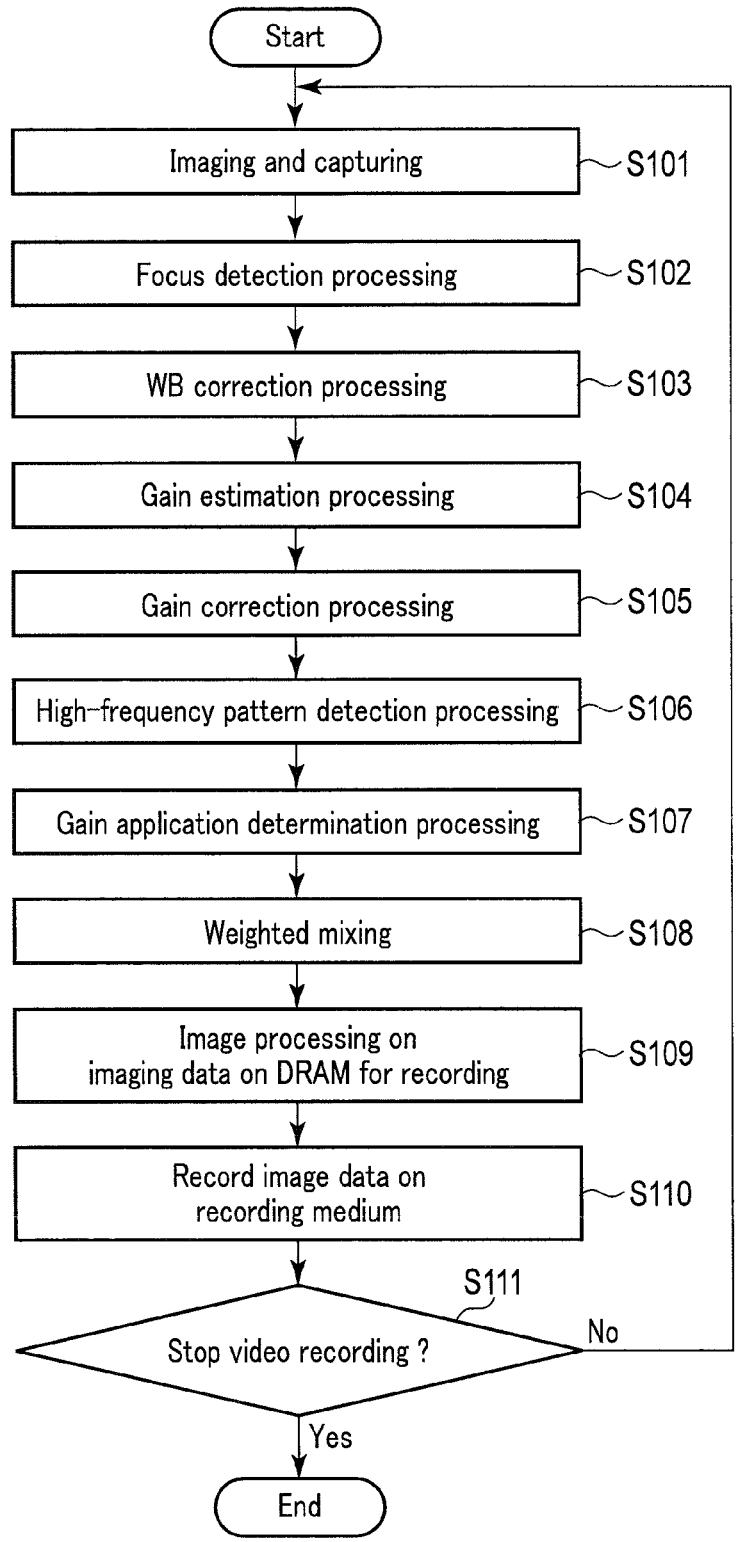
FIG. 6 is a flowchart illustrating moving image recording processing.

The following is an explanation of operations of the imaging apparatus of the present embodiment. FIG. 6 is a flowchart illustrating moving image recording processing performed by the imaging apparatus. The processing of the flowchart illustrated in FIG. 6 is executed by the CPU 29 based on the program stored in the ROM 43. The processing illustrated in FIG. 6 is also applicable to still image recording processing and live-view display processing.

When the processing in the flowchart of FIG. 6 is started, the CPU 29 causes the imaging element 29 to perform imaging (exposure) (Step S101). An image signal obtained by imaging is read out from the imaging element 21 in accordance with the reading method corresponding to driving mode set in advance. The read image signal is amplified in the A-AMP 25, digitized in the ADC 27, and thereafter temporarily stored as imaging data in the DRAM 41.

Next, the CPU 29 performs focus detection processing (Step S102). In the step, the CPU 29 causes the focus detection circuit 33 to perform focus detection processing. In response to an instruction to perform focus detection processing, the focus detection circuit 33 reads out pixel data corresponding to the focus detection pixel from imaging data temporarily stored in the DRAM 41, and calculates the defocusing direction and the defocusing amount of the imaging lens 11 by a publicly-known phase difference method using the pixel data. Thereafter, the CPU 29 controls the driving unit 17 based on the defocusing direction and the defocusing amount of the imaging lens 11 detected by the focus detection circuit 33, to focus the imaging lens 11.

After the focus detection processing, the CPU 29 causes the image processor 31 to perform image processing. In response to this, the WB correction processor 311 of the image processor 31 performs white balance correction processing on the pixel data (Step S103). Thereafter, the gain amount estimation unit 312 performs gain estimation processing (Step S104). For example, the gain amount is estimated from a ratio of the pixel output of the focus detection pixel to the pixel output of the imaging pixel of the same color around the focus detection pixel, or a difference between the pixel outputs. For example, the ratio Dif_p of the pixel outputs is calculated in accordance with the following (Expression 1).

$$Dif\_p = Gr1/Gr2 \quad \text{(Expression 1)}$$

Gr1 in (Expression 1) represents the pixel output of the imaging pixel, and Gr2 in (Expression 1) represents the pixel output of the focus detection pixel. The imaging pixel Gr1 is a pixel output of the imaging pixel of the same color that is disposed in a direction orthogonal to the direction of detecting a phase difference by the focus detection pixel. For example, supposing that the focus detection pixels are disposed in Gr pixels like FIG. 2 in the case of using an imaging element of Bayer array, the imaging pixel Gr1 is, for example, a Gr pixel in a position that is shifted upward or downward by two pixels from the focus detection pixel Gr2. As a matter of course, the amount of pixel shift is not limited to two pixels.

After the gain estimation processing, the gain correction unit 313 performs gain correction processing (Step S105). The gain correction processing is correction of multiplying the value obtained by (Expression 1) by the pixel output of each focus detection pixel. This correction corrects a decrease in light amount in the pixel output of each focus detection pixel.

After the gain correction processing, the high-frequency pattern detector 3141 of the interpolation determination processor 314 performs high-frequency pattern detection processing to detect a high-frequency degree of the subject image pattern in the imaging data (Step S106). The following is an explanation of an example of the high-frequency pattern detection processing.

Figures 7A, 7B:
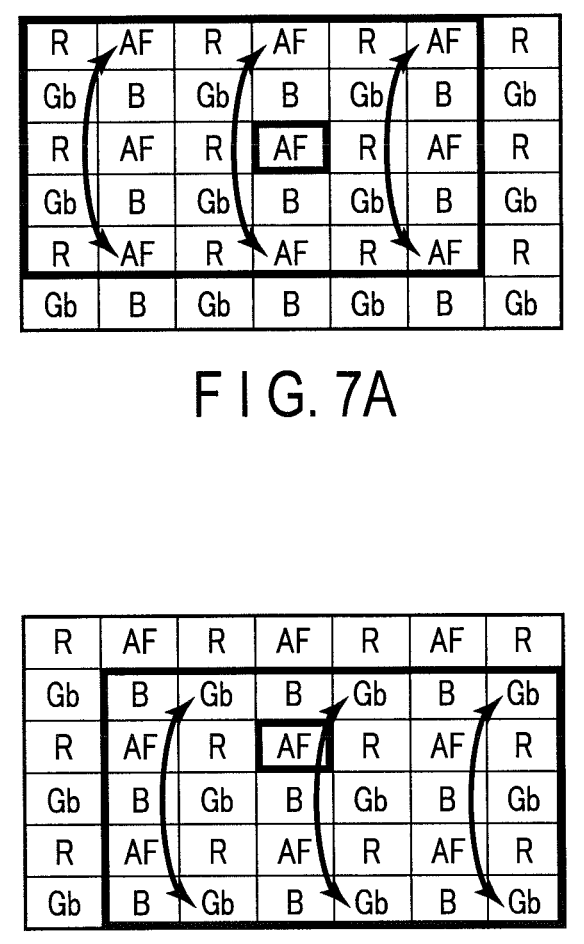

FIG. 7A and FIG. 7B are diagrams for explaining an example of the high-frequency pattern detection processing. In the state where "a high-frequency degree of the subject image pattern is high" in the present embodiment indicates a state where a repetitive pattern caused by a moire or the like occurs in the subject image". To determine such a state, as illustrated in FIG. 7A, the high-frequency pattern detector 3141 calculates an arithmetic mean of pixels of two focus detection pixels Gr (AF) located in the same position in the horizontal direction serving as the phase difference detecting direction with respect to the focus detection pixel Gr (AF) serving as a target of interpolation processing, that is, arithmetic means of pixel outputs of focus detection pixels located to extend over the vertical direction of the focus detection pixel Gr (AF) serving as a target of interpolation processing. Thereafter, the high-frequency pattern detector 3141 calculates arithmetic mean values of pixel outputs of two focus detection pixels Gr (AF) located to extend over the vertical direction of other focus detection pixels Gr (AF) that are located in positions shifted by two pixels from the focus detection pixel Gr (AF) serving as a target of interpolation processing along the horizontal direction (right direction and left direction) serving as the phase difference detecting direction. The high-frequency pattern detector 3141 integrates the three arithmetic mean values obtained by the above calculations. Each of the arithmetic mean values indicates a change amount of an average of pixel outputs of the focus detection pixels in a direction perpendicular to the phase difference detecting direction. The result of integration of the arithmetic mean values indicates a pattern of the subject image formed on the focus detection pixels.

Thereafter, as illustrated in FIG. 7B, the high-frequency pattern detector 3141 calculates an arithmetic mean value of pixel outputs of imaging pixels Gb located to extend over the vertical direction of the imaging pixel Gb around (in a right slanting downward position in the drawing) the focus detection pixel Gr (AF) serving as a target of interpolation processing. The high-frequency pattern detector 3141 also calculates arithmetic mean values of pixel outputs of two imaging pixels Gb located to extend over the vertical direction of imaging pixels Gb that are located in positions shifted by two pixels from the imaging pixel Gb, for which an arithmetic mean value has been calculated previously, along the horizontal direction (right direction and left direction). The high-frequency pattern detector 3141 integrates the three arithmetic mean values obtained by the above calculations. Each of the arithmetic mean values indicates a change amount of an average of pixel outputs of the imaging pixels in a direction perpendicular to the phase difference detecting direction. The result of integration of the arithmetic mean values indicates a pattern of the subject image formed on the imaging pixels.

Thereafter, the frequency pattern detector 3141 calculates an absolute difference value between the integrated value calculated for the focus detection pixel Gr (AF) and the integrated value calculated for the imaging pixel Gb, as an evaluation value indicating the high-frequency degree of the subject image pattern. The evaluation value increases as a difference between the pixel output change in the focus detection pixel Gr (AF) and the pixel output change in the imaging pixel Gb increases. Accordingly, a larger evaluation value indicates higher possibility that the subject image pattern is a high frequency, that is, the subject image is a repetitive pattern. In the case where the subject image is a repetitive pattern, because a large difference exists between the pixel output change of the focus detection pixel and the pixel output change of the peripheral imaging pixel, correcting the pixel output of the focus detection pixel using a peripheral pixel causes a large error due to the influence of the peripheral pixel on the pixel output of the focus detection pixel. For this reason, in the present embodiment, the rate of interpolation processing using the peripheral pixel is reduced when the high-frequency degree of the subject image is high.

After the high-frequency pattern detection processing, the application determination unit 3142 of the interpolation determination processor 314 performs gain application determination processing to determine the application rate of the pixel output of the focus detection pixel subjected to gain correction by the gain correction unit 313 (Step S107). In the gain application determination processing, first, the application determination unit 3142 calculates a temporary application rate in accordance with a variation (standard deviation) of the pixel outputs of the imaging pixels around the phase difference detection pixel. Thereafter, the application determination unit 3142 determines a final application rate such that the application rate of the gain-corrected pixel output of the focus detection pixel increases with increased evaluation value, that is, the high-frequency degree of the subject image pattern is high. For example, the application determination unit 3142 changes the value of the application rate of the pixel output of the focus detection pixel that is linearly gain-corrected with respect to the value of the evaluation value.

After the gain application determination processing, the interpolation processor 315 performs interpolation processing to perform weighted addition on the pixel output of the focus detection pixel subjected to gain correction by the gain correction unit 313 and the pixel output of the peripheral imaging pixel, in accordance with the application rate determined in the interpolation determination processor 314 (Step S108).

After the interpolation processing, the image processor 31 performs image processing following the interpolation processing (Step S109). After the image processing is finished, the CPU 29 records the image data that is temporarily stored in the DRAM 41 as a result of image processing on the recording medium 45 (Step S110). Thereafter, the CPU 29 determines whether to stop moving image recording (Step S111). In the step, the CPU 29 determines the operating state of the release button of the operating unit 19. Specifically, the CPU 29 determines that video recording is stopped when the release button is pressed again.

In Step S111, when the CPU 29 determines that video recording is not stopped, the CPU 29 returns the processing to Step S101, and continues video recording. By contrast, in Step S112, when the CPU 29 determines that video recording is stopped, the CPU 29 ends the processing in FIG. 6.

As explained above, the present embodiment has the structure of determining a degree of a high-frequency pattern of the subject image pattern around the focus detection pixel, and increasing the application rate of the pixel output of the focus detection pixel that is gain-corrected in comparison with the interpolation output from the imaging pixel around the focus detection pixel, when the degree of the high-frequency pattern of the subject image pattern is high. This structure enables a reduction in deterioration of image quality due to application of interpolation processing in the case where the subject image is a repetitive pattern.

The present embodiment has a structure of calculating an arithmetic mean value of pixel outputs of focus detection pixels that are located by two pixels above and under the focus detection pixel serving as a target of interpolation processing. However, the pixel shift amount from the focus detection pixel serving as a target of interpolation processing is not limited to two pixels. For example, a mean value of pixel outputs of focus detection pixels that are located by four pixels above and under the focus detection pixel may be calculated in the case of a Bayer array. However, it is desirable to make equal the pixel shift amount in the vertical direction of the focus detection pixel and the pixel shift amount in the vertical direction of the imaging pixel. In addition, the focus detection pixels for which an arithmetic mean value is determined may be focus detection pixels that are located to extend over another focus detection pixel that is located in a position shifted in the horizontal direction from the focus detection pixel serving as a target of interpolation processing.

In addition, the present embodiment has a structure of calculating an arithmetic mean value for the imaging pixel located adjacent by one pixel in the horizontal direction to the focus detection pixel serving as a target of interpolation processing. The pixel shift amount in the horizontal direction is not limited to one pixel. Further, as a result of pixel shift in the horizontal direction, the color of the imaging pixels for which an arithmetic mean value is determined may be different from the focus detection pixel, or the imaging pixels for which an arithmetic mean value is determined may be focus detection pixels.

The pixel shift amount may be adaptively changed in accordance with conditions such as the driving mode of the imaging element 21. For example, when the driving mode of the imaging element 21 is a driving mode for moving image recording or in live-view display, the pixel shift amount may be reduced to enable accurate determination of a high-frequency degree of the subject image pattern.

The present embodiment also has a structure of calculating an arithmetic mean value of pixel outputs of pixels that are arranged in the vertical direction. This is because the phase difference detecting direction is the horizontal direction. For example, when the phase difference detecting direction is the vertical direction, an arithmetic mean value of pixels that are arranged in the horizontal direction is calculated to determine the high-frequency degree of the subject image pattern. Specifically, an arithmetic mean value of pixels that are arranged in a direction perpendicular to the phase difference detecting direction is calculated.

Although the present invention has a structure of calculating an arithmetic mean value of pixels that are arranged in a direction perpendicular to the phase difference detecting direction to determine the high-frequency degree of the subject image pattern, a geometric mean value thereof may be calculated. The evaluation value may be a square difference value, not an absolute difference value. The evaluation value and the like are calculated by properly using the four operations in combination like this.

Each processing according to the embodiment described above may be stored as a program that can be executed by the CPU 29, or may be stored and distributed in a storage medium of an external storage device, such as a memory card (such as a ROM card and a RAM card), a magnetic disk (such as a floppy disk and a hard disk), an optical disk (such as a CD-ROM and a DVD), and a semiconductor memory. The CPU 29 can execute the processing described above by reading the program stored in the storage medium of the external storage device and being controlled by the read program.

What is claimed is:

1. An imaging apparatus comprising:
   an imaging element including imaging pixels and a focus detection pixel;
   a high-frequency pattern detector detecting a high-frequency degree of a subject image pattern received by the imaging element, based on pixel outputs of a plurality of imaging pixels located around the focus detection pixel and a pixel output of the focus detection pixel;
   an interpolation processor performing an interpolation operation using the pixel outputs of the imaging pixels located around the focus detection pixel, determining an interpolation output corresponding to the pixel output of the focus detection pixel, and performing weighted mixing of the determined interpolation output with the pixel output of the focus detection pixel; and
   an application determination unit determining a mixing rate used in the weighted mixing in the interpolation processor based on an output of the high-frequency pattern detector,
   wherein the high-frequency pattern detector calculates a difference or a ratio between a value obtained by integrating averages of pixel outputs of a first pixel group arranged in identical positions in a vertical direction with respect to the focus detection pixel or in identical positions in a vertical direction with respect to another focus detection pixel located around the focus detection pixel and a value obtained by integrating averages of pixel outputs of a second pixel group arranged in positions shifted from the first pixel group in the horizontal or vertical direction, and sets the high-frequency degree in accordance with a magnitude of the difference or the ratio, and wherein the application determination unit increases the mixing rate of the focus detection pixel when the high-frequency pattern degree is high.

2. The imaging apparatus according to claim 1, wherein the high-frequency pattern detector adaptively changes a position of the first pixel group and a shift amount of the second pixel group from the first pixel group, depending on a disposition of the focus detection pixel or an operating mode of the imaging apparatus.

3. The imaging apparatus according to claim 1, wherein the application determination unit increases the mixing rate of the interpolation output when the high-frequency pattern degree is low.

4. An imaging processing method of processing pixel outputs of an imaging element including imaging pixels and a focus detection pixel, comprising:
    detecting a high-frequency degree of a subject image pattern received by the imaging element, based on pixel outputs of a plurality of imaging pixels located around the focus detection pixel and a pixel output of the focus detection pixel;
    determining a mixing rate used in weighted mixing of an interpolation output with the pixel output of the focus detection pixel based on the high-frequency degree; and
    performing an interpolation operation using the pixel outputs of the imaging pixels located around the focus detection pixel, determining the interpolation output corresponding to the pixel output of the focus detection pixel, and performing weighted mixing of the determined interpolation output with the pixel output of the focus detection pixel,
    when the high-frequency degree is detected, a difference or a ratio is calculated, the difference or a ratio being a difference or a ratio between a value obtained by integrating averages of pixel outputs of a first pixel group arranged in identical positions in a vertical direction with respect to the focus detection pixel or in identical positions in a vertical direction with respect to another focus detection pixel located around the focus detection pixel and a value obtained by integrating averages of pixel outputs of a second pixel group arranged in positions shifted from the first pixel group in the horizontal or vertical direction, and sets the high-frequency degree in accordance with a magnitude of the difference or the ratio, and
    when the mixing rate is determined, the mixing rate of the focus detection pixel is increased when the high-frequency pattern degree is high.

5. The image processing method according to claim 4, wherein the detecting the high-frequency degree includes adaptively changing a position of the first pixel group and a shift amount of the second pixel group from the first pixel group, depending on a disposition of the focus detection pixel or an operating mode of an imaging apparatus.

6. The image processing method according to claim 4, wherein the performing weighted mixing includes increasing the mixing rate of the interpolation output when the high-frequency pattern degree is low.

* * * * *